P. N. JONES.
EQUALIZING TRUCK MOUNTING FOR ELECTRIC TRACTION CARS.
APPLICATION FILED SEPT. 18, 1908.
953,910.
Patented Apr. 5, 1910.
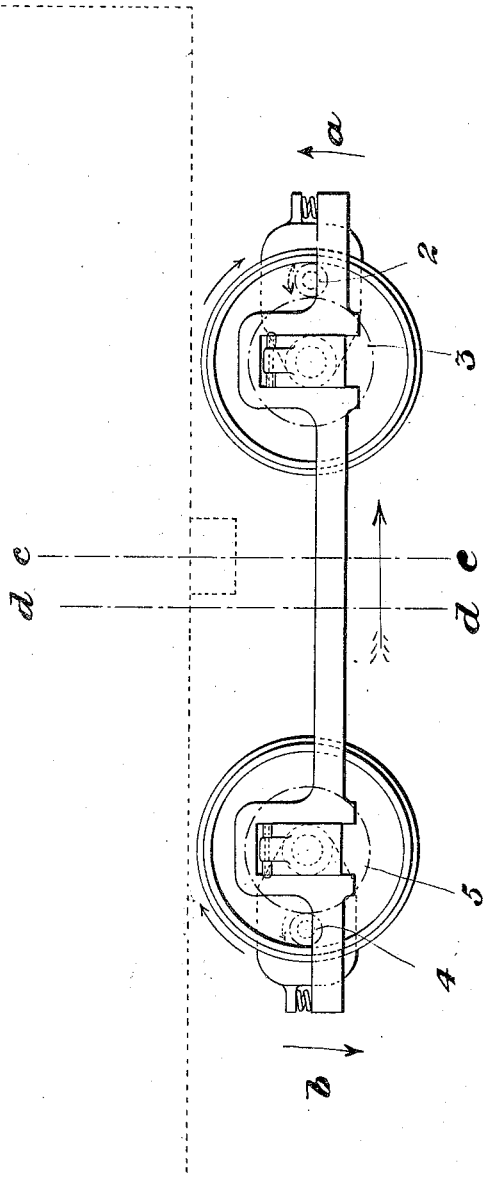

UNITED STATES PATENT OFFICE.

PEARL N. JONES, OF PITTSBURG, PENNSYLVANIA.

EQUALIZING TRUCK-MOUNTING FOR ELECTRIC TRACTION-CARS.

953,910.  Specification of Letters Patent.  Patented Apr. 5, 1910.

Application filed September 18, 1908. Serial No. 453,594.

*To all whom it may concern:*

Be it known that I, PEARL N. JONES, a citizen of the United States, residing at Pittsburg, in the county of Allegheny and State of Pennsylvania, have invented certain new and useful Improvements in Equalizing Truck-Mountings for Electric Traction-Cars, of which the following is a specification, reference being had therein to the accompanying drawing.

My invention refers to improvements in car trucks, more particularly the trucks of electric motor driven cars, and it has for its object to provide a construction adapted to equalize the pressure on the truck due to the dead weight of the car combined with the varying effect of the motors and gearing in service, to produce equilibrium and resulting equal division of the weight on the front and back wheels, with resulting equality of traction.

The invention is particularly adapted to four motor equipments, two to each truck, but may be utilized to advantage with single truck cars of four wheels only.

In a four motor equipment, during quick acceleration, that set of wheels nearest the front end of the car is most liable to slip, and the third set also frequently slip, but the second set very seldom and the rear wheels almost never slip. This condition is especially noticeable in connection with "outside hung" motors used with trucks of short wheel base. This is due to an unequal distribution of the combined weight and pressure on the four axles, under the customary practice of mounting the car body on bolsters midway of the trucks and of the motor centers, and is due to two reasons, to wit: First. The motors, due to their torque, cause a lifting of the front end of the truck and a corresponding depression of the rear end, throwing the excess weight or pressure on the rear axle and wheels. Second. The overcoming of the inertia of the car in starting transfers weight: $a$, from the front to the rear truck, and $b$, from the front to the rear axle of each truck. I have found in practice that the difference in pressure at front and back is excessive as shown by actual tests. Thus in an ordinary car having trucks of four feet six inches wheel base each equipped with two outside hung standard 50 H. P. motors having gear ratios approximating four to one, the down pressure on the rear axle at starting exceeds that on the front axle by four thousand pounds, due solely to the action of the motors with 200 amperes passing through them.

My invention consists in so mounting the car body on the trucks and in such relation to the motors, gearing and axles, that the bearing point shall be so positioned as to exert pressure through the front and rear portions of the truck in ratios adapted to counteract the effects noted.

In the drawing accompanying the specification I show a front truck and a portion of a car. with the axles, gearing and motors of the "outside hung" arrangement.

The pinion 2 of the front motor engages the teeth of wheel 3 of the front axle, in front, and pinion 4 of the rear motor engages the teeth of wheel 5 of the rear axle, at back, in the manner shown. The result of such mounting is that as the pinions commence to revolve in starting, they first tend to climb on the teeth of wheels 3 and 5 respectively, *i. e.*, upwardly on teeth of wheel 3 and downwardly on teeth of wheel 5, and before the car is started, excessive upward pressure is exerted on the front of the truck as indicated by arrow $a$ and similar downward pressure on the rear of the truck, as indicated by arrow $b$, the combined effect resulting in the aggregate of both pressures being transferred to the rear axle and wheels. To counteract this effect, and to so distribute the weight of the car through the truck that it will normally exert an excess of pressure on the front axle and a reduced pressure on the rear axle corresponding to the uplifting and depressing effect of the gear action on these axles respectively, thereby equalizing their pressure and wheel traction, the supporting center $c$, $c$, of the truck and its bolster is located in front of the normal midway center $d$, $d$, a distance sufficient to effect such result. The location of the center will be controlled by the conditions of weight, proportions, currents, etc., and the center should be so located that it will constitute in effect a fulcrum between the long and short arms of the truck which in turn are affected by the varying pressures, and thus operate to balance them and distribute the load therethrough under the recognized laws of leverage.

The advantages of the invention will be appreciated by all those familiar with the construction and operation of street railway cars. It results in better and equal traction; overcomes the strains and distortions due to unequal distribution of power in starting and running, particularly on grades; and insures greater economy of current and longer life to the entire structure and its working parts.

What I claim is:

1. In a car truck, the combination with the car body, of the truck, front and back axles therein having supporting traction wheels, an outside-hung motor behind the rear axle, gearing connecting said motor with the rear axle, and a supporting bolster having a bearing for the car body and located transversely of the truck forwardly of the normal middle position between the axles whereby the weight of the car normally exerts less pressure on the back axle than on the front and whereby the normal pressure on the back axle is abnormally increased in starting the car due to the torque of the motor.

2. In a car truck, the combination with the car body, of the truck, front and back axles therein having supporting traction wheels, an outside-hung motor in front of the front axle, gearing connecting said motor with the front axle, a supporting bolster having a bearing for the car body and located transversely of the truck forwardly of the normal middle position between the axles whereby the weight of the car normally exerts less pressure on the back axle than on the front, an outside-hung motor behind the rear axle, and gearing connecting said motor with the rear axle whereby the normal pressure on the back axle is abnormally increased in starting the car due to the torque of the motor.

In testimony whereof I affix my signature in presence of two witnesses.

PEARL N. JONES.

Witnesses:
C. M. CLARKE,
CHAS. S. LEPLEY.